(12) United States Patent
Fu et al.

(10) Patent No.: US 7,904,597 B2
(45) Date of Patent: Mar. 8, 2011

(54) SYSTEMS AND PROCESSES OF IDENTIFYING P2P APPLICATIONS BASED ON BEHAVIORAL SIGNATURES

(75) Inventors: Zhengjia Fu, Hong Kong (CN); Dah Ming Chiu, Hong Kong (CN)

(73) Assignee: The Chinese University of Hong Kong (HK)

( * ) Notice: Subject to any disclaimer, the term of this patent is extended or adjusted under 35 U.S.C. 154(b) by 460 days.

(21) Appl. No.: 12/018,676

(22) Filed: Jan. 23, 2008

(65) Prior Publication Data

US 2009/0187653 A1    Jul. 23, 2009

(51) Int. Cl.
    *G06F 15/16* (2006.01)
(52) U.S. Cl. ............... 709/246; 709/223; 709/224
(58) Field of Classification Search .......... 709/223, 709/224, 246; 370/252, 392; 340/540; 713/201 707/10
    See application file for complete search history.

(56) References Cited

U.S. PATENT DOCUMENTS

| | | | |
|---|---|---|---|
| 7,050,435 B1 | 5/2006 | Walker et al. | |
| 7,095,715 B2 | 8/2006 | Buckman et al. | |
| 7,154,416 B1 | 12/2006 | Savage et al. | |
| 7,155,502 B1 | 12/2006 | Galloway et al. | |
| 7,185,081 B1 | 2/2007 | Liao et al. | |
| 7,260,102 B2 | 8/2007 | Mehrvar et al. | |
| 7,283,468 B1 | 10/2007 | Hill et al. | |
| 7,283,475 B2 | 10/2007 | Fortin et al. | |
| 2004/0083388 A1* | 4/2004 | Nguyen ................. | 713/201 |
| 2004/0158630 A1* | 8/2004 | Chang et al. ........... | 709/224 |
| 2005/0267896 A1* | 12/2005 | Goodman et al. ...... | 707/10 |
| 2008/0089238 A1* | 4/2008 | Fahmy .................... | 370/252 |
| 2008/0235370 A1* | 9/2008 | Choi et al. ............... | 709/224 |
| 2009/0077228 A1* | 3/2009 | Weil et al. .............. | 709/224 |
| 2009/0100173 A1* | 4/2009 | Nagoya et al. ......... | 709/224 |
| 2009/0174551 A1* | 7/2009 | Quinn et al. ............ | 340/540 |
| 2009/0232138 A1* | 9/2009 | Gobara et al. .......... | 370/392 |

FOREIGN PATENT DOCUMENTS

| | | |
|---|---|---|
| WO | 2004/061572 | 7/2004 |
| WO | 2007/103864 A2 | 9/2007 |

OTHER PUBLICATIONS

Karagiannis, Thomas et al., "BLINC: Multilevel Traffic Classification in the Dark," SIGCOMM '05, Aug. 21-26, 2005, 12 pages.
Karagiannis, Thomas et al., "Transport Layer Identification of P2P Traffic," IMC '04, Oct. 25-27, 2004, 14 pages.

(Continued)

*Primary Examiner* — Le Luu
(74) *Attorney, Agent, or Firm* — Schwegman, Lundberg & Woessner, P.A.

(57) ABSTRACT

Disclosed are a system and a process for identifying P2P applications and specific P2P software as well from an original mixed packet trace based on behavioral-signatures. The behavioral-signature based system and process according to the invention is mainly to check whether the application has these specific periodic behaviors or not. The process of this invention comprises the steps of filtering out all irrelative packets; translating the filtered packet trace into discrete-time sequences; processing the sequences to obtain frequency-domain characteristics of original packet trace; and analyzing the frequency-domain characteristics and determining the identification.

22 Claims, 8 Drawing Sheets

OTHER PUBLICATIONS

Moore, Andrew W. et al., "Internet Traffic Classification Using Bayesian Analysis Techniques," SIGMETRICS '05, Jun. 6-10, 2005, pp. 50-60 (11 pages). Sen, Subhabrata et al., "Accurate, Scalable In-Netowrk Identification of P2P Traffic Using Application Signatures," WWW2004, May 17-22, 2004, pp. 512-521 (10 pages).

WIPO Patentscope Search For: "traffic classification", World Intellectual Property Organization: IP Services, 2 pages, http://www.wipo.int/cgi-pct/guest/search5 (accessed Oct. 21, 2007).

WIPO Patentscope Search For: "network traffic classification", World Intellectual Property Organization: IP Services, 1 page, http://www.wipo.int/pctdb/en/search.jsp (accessed Oct. 21, 2007).

* cited by examiner

| TS: | 1 | 2 | 3 | 4 | 5 | 6 | 7 | 8 | 9 | 10 | 11 | 12 |
|---|---|---|---|---|---|---|---|---|---|---|---|---|
| Packet: | P1 | | | P2 | | P3 | | | | | P4 | P5 |
| Session | Session1 |||||| | | | | Session2 ||

SYSTEMS AND PROCESSES OF IDENTIFYING P2P APPLICATIONS BASED ON BEHAVIORAL SIGNATURES

TECHNICAL FIELD

The present invention relates to a system and process for traffic identification, and more particularly, to a system and process for identifying Peer-to-Peer (P2P) applications from a mixed traffic trace.

BACKGROUND OF THE INVENTION

There is a dramatic increase in peer-to-peer applications running over the Internet and enterprise IP networks during the past few years. The P2P applications include P2P content distribution applications like Bit-torrent, Bit-comet and E-donkey, etc., and P2P streaming applications like PPlive, PPstream, Sopoast and so on. These applications constitute a large share of the total traffic in networks.

Network operators of both the Internet and enterprise networks require an ability to identify various P2P applications and their associated traffic in order to achieve network operations and management, traffic engineering, capacity planning, provisioning and cost reduction. For instance, by rate-limiting or blocking P2P traffic, an enterprise should ensure the good performance of critical applications. Broadband ISPs would like to limit the P2P traffic to reduce the cost charged by upstream ISPs.

There are several existing approaches to identify the P2P traffic. Network port-based identification was used and seemed to be effective in earlier days because at that time, most P2P applications adopted default and fixed transport-layer port numbers. However, nowadays, it is found that substantial P2P traffic is transmitted over a large number of non-standard ports, making default port-based identification useless.

Signature-based identification is designed to reliably identify P2P applications. It requires checking packet-payload to find application-specific signatures. However, due to hardware resource limitations, payload encryption by applications, privacy and legal issues and those similar practical problems, it is a difficult task to obtain the packet-payload.

It is known that, P2P applications have their special behaviors because of their Peer-to-Peer characteristics, compared with those traditional applications like DNS, E-mail and Web. Besides those special behaviors different from those traditional applications, P2P content distribution and P2P streaming are still different from each other in the sense of the special behaviors.

There are two kinds of periodic behaviors of the P2P applications. One is peer selection or peer changing related behaviors, which both P2P content distribution and P2P streaming applications have. For P2P content distribution applications, peers run choking and optimistic unchoking periodically in order to keep effective neighbors. For P2P streaming applications, peers also apply peer selection algorithms but not choking and optimistic unchoking. They select peers based on the neighbors' responses to the buffer information they sent out before. Another kind of the periodic behavior is that a peer which is running a P2P streaming application periodically sends out its streaming buffer information (Buffer Map) to quite a number of its neighbor peers, which causes a sudden increase of the number of concurrent connections between the peer and different remote hosts in a short period.

Recently, a novel approach called BLINC is proposed to identify Internet applications only using flow-level information generated by a current flow collector (Cisco Netflow etc.). BLINC shifts the focus from identifying each individual flow to associating Internet hosts with applications. The novelty is to identify hosts by capturing the fundamental patterns of their behaviors at the transport layer. However, BLINC can identify the type of an application (WEB, DNS, FTP, ATTACK or P2P) only, without any ability to tell what specific software (P2P content distribution such as Bit-torrent, Bit-Comet, etc. and P2P streaming such as PPLive, PPstream, etc.) is.

SUMMARY OF THE INVENTION

In view of the shortcoming of the prior art, the present invention is to provide a novel system and process of identifying Peer-to-Peer applications from a mixed traffic trace. According to the invention, the identification is proceeded on the basis of the behavioral-signatures of Peer-to-Peer applications. Not only applications but also specific P2P software such as Bit-torrent, Bit-comet (P2P content distribution applications), and PPlive, PPstream (P2P streaming applications) could be identified.

In view of the issues in the known systems, there is no necessity for the system and process according to the invention to access to any packet payloads. Instead, only packet header including time stamp, source IP address and port number, destination IP address and port number and transport layer protocol is required. In addition, the system and process does not use any well-known port numbers solving the identification problem.

The present invention provides a system for identifying P2P applications on a network based on behavioral-signatures, comprising: a retrieving unit configured to retrieve a packet header of each packet from a packet trace collected from the network; a filter configured to filter out all the irrelative packets from the retrieved packets and allow packets equipped with a target IP or IP-port pair to pass through; a first sequence generating unit configured to generate a first discrete-time sequence from the packets equipped with the target IP or IP-port pair; a second sequence generating unit configured to generate a second discrete-time sequence from the packets equipped with the target IP or IP-port pair; a sequence processor configured to generate frequency-domain characteristics of the first and the second sequences; and an analyzer configured to capture the frequency-domain characteristics so as to identify the P2P applications based on the frequency-domain characteristics.

Further, the present invention provides a process of identifying P2P applications on a network based on behavioral-signatures, comprising: retrieving a packet header of each packet from a packet trace collected from the networks; filtering out the retrieved packets and outputting packets equipped with a target IP or IP-port pair; generating a first discrete-time sequence from the packets equipped with the target IP or IP-port pair; generating a second discrete-time sequence from packets associated with the target IP or IP-port pair; generating frequency-domain characteristics of the first and the second sequences; and analyzing the frequency-domain characteristics to identify the P2P applications.

DETAILED DESCRIPTION

Embodiments of the present invention will be described with reference to the accompanying drawings, but these drawings are presented only for the illustrative purpose and in no respect, are intended to limit the present invention.

Figure 1:
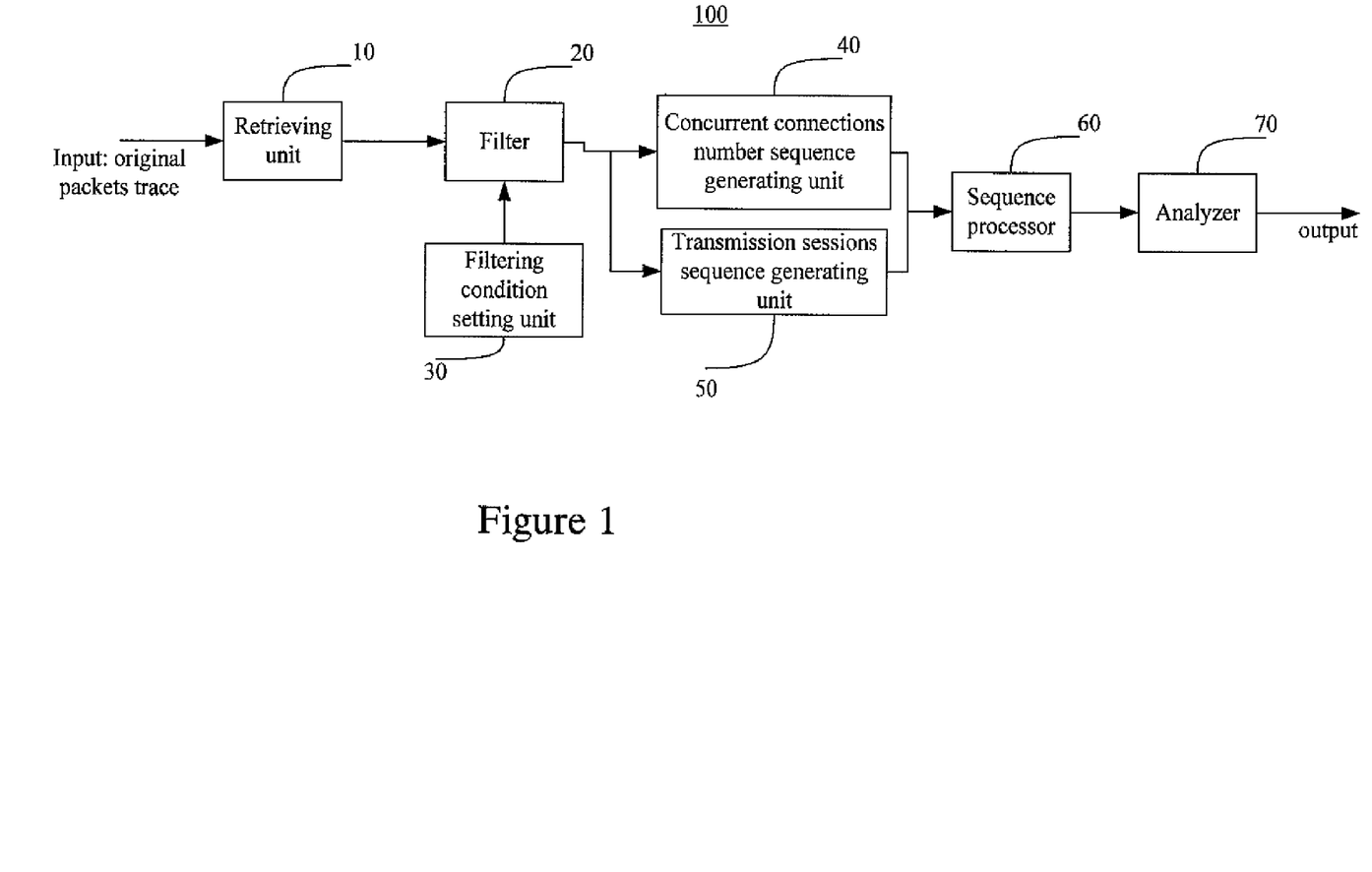
FIG. 1 is a block diagram schematically illustrating the system of identifying P2P applications and specific P2P software according to the present invention.

FIG. 1 shows an exemplary system 100 configured to identify P2P applications and specific P2P software from an original mixed packet trace according to the invention.

As shown in FIG. 1, the system 100 comprises a retrieving unit 10, a filter 20, a filtering conditions setting unit 30, a concurrent connections number sequence generating unit 40, a transmission sessions sequence generating unit 50, a sequence processor (SP) 60 and an analyzer 70.

The retrieving unit 10 is configured to retrieve a packet header from each packet in a packet trace. The retrieved packet header may include packet time stamp (TS), transport layer protocol (TCP or UDP), source IP address, source port number, and destination IP address and destination port number, or the like.

The filter 20 receives the retrieved packet header from the retrieving unit 10 and operates to filter packets associated with the retrieved packet header based on filtering conditions set forth by the filtering conditions setting unit 30. The filtering conditions are used to set and configure one particular IP or IP-port pair as a target, which is called a target IP or IP-port pair and will be discussed for details later. As emphasized above, the system 100 according to the invention requires the packet header for identifying P2P applications. Thus, what the system is processing is the packet header only retrieved from each packet of the mixed packet trace.

Specifically, the filter 20 filters out packets which do not belong to P2P applications. For example, packets with some special IP addresses (either source or destination address) like 0.0.0.0 or 255.255.255.255 are definitely irrelative to P2P applications. Also, packets with those well-known port numbers (either source or destination port number) such as TCP/21 (FTP), TCP or UDP/23 (Telnet) etc. belong to other fixed applications than P2P applications and should be filtered out as well. It is understood that, if those irrelative packets remain in the packet trace and become a part of the source of the later sequences, the final results of identification might be biased.

Moreover, the filter 20 allows those packets satisfying with the filtering conditions to pass. Each of those passed packets is equipped with the target IP or IP-port pair, no matter whether it is the source IP, source IP-port pair, destination IP, or destination IP-port pair. Afterwards, all the packets related to the target IP or IP-port pair are processed in the system 100. In other words, the output of the filter 20 is a packet trace comprising all the packets equipped with the target IP or IP-port pair which is compliance with filtering conditions from the filtering conditions setting unit 30.

After all the irrelative packets are filtered out and only the packets equipped with the target IP or IP-port pair pass through the filter 10, the concurrent connections number sequence generating unit 40, the transmission sessions sequence generating unit 50, the sequence processor (SP) 60 and the analyzer 70 are provided to execute the identification particularly on the target IP or IP-port pair.

As a matter of fact, it is understandable that the system 100 works iteratively. As the filtering conditions setting unit 30 changes the conditions each time, a new target IP or IP-port pair will occur. After all IPs or IP-port pairs of the original packet trace experience this whole process and obtain the results, the identification is done.

As is discussed above, there are two kinds of periodic behaviors of P2P applications. One is the peer selection or peer changing related behavior which both P2P content distribution and P2P streaming applications have. Another periodic behavior is that P2P streaming peers periodically send out buffer information to their neighbor peers. As a result, at the moment that one peer sends out buffer information to its neighbor peers, the number of concurrent connections of the peer will suddenly increase sharply.

The concurrent connections number sequence generating unit 40 and the transmission sessions sequence generating unit 50 are configured to catch the above two periodic behaviors, respectively.

Figure 2:
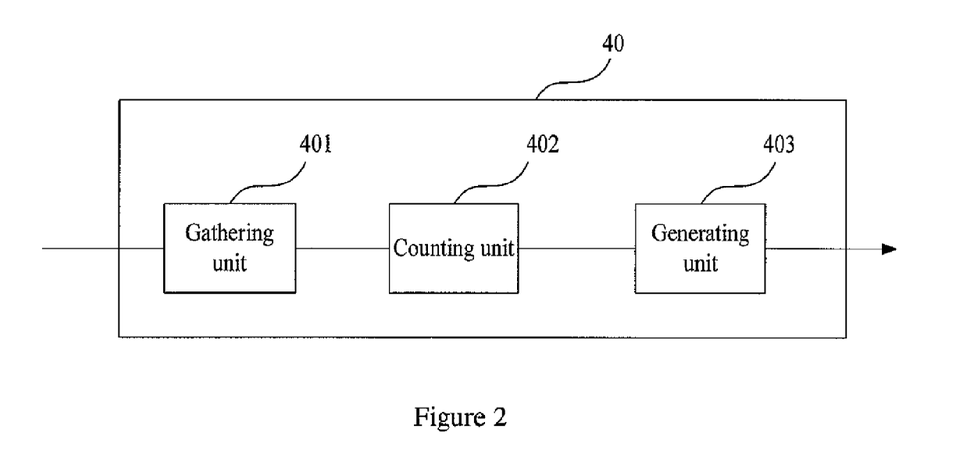
FIG. 2 is a block diagram schematically illustrating the concurrent connections number sequence generating unit showed in FIG. 1.

Referring to FIG. 2, the concurrent connections number sequence generating unit 40 includes a gathering unit 401, a counting unit 402 and a generating unit 403. As described above, all the packets to be received by the concurrent connections number sequence generating unit 40 are equipped with the target IP or IP-port pair.

The gathering unit 401 gathers all the packets whose time stamps (TSs) belong to the same time interval into one group. For example, if the time interval is set to 1 second, packets with time stamps 1.12, 1.34, 1.57, 1.86 and packets with time stamps 2.34, 2.45, 2.89 are gathered by the gathering unit 301, respectively, into two groups.

The counting unit 402 counts concurrent connections of one target IP or IP-port pair associated with each of the gathered packets. In fact, all these gathered packets share a common characteristic, either their source IP or IP-port pair or destination IP or IP-port pair being same, just the target IP or IP-port pair. On the other hand, each packet has both source and destination IP or IP-port pair. Excluding the target IP or IP-port pair each packet has (either at the source or destination position), two packets are considered belonging to different concurrent connections only when the remaining IPs or IP-port pairs of these two packets are different, otherwise they are considered belonging to the same current connection. Herein, the remaining IP or IP-port pair is referred to as non-target IP or IP-port. The counting unit 402 maintains one table for each time interval, wherein the table records different non-target IPs or IP-port pairs. When the counting unit 402 counts, only the non-target IP or IP-port pair information in packets makes sense. When the non-target IP or IP-port pair of a packet does not have a record in the table, a new record will be appended to the table. In other words, the table only records non-target IP or IP-port pair, regardless of whether it is source IP, IP-port pair or destination IP, IP-port pair. After checking all the packets belonging to the same time interval, the number of the records in the related table is the same as the number of concurrent connections of one target IP or IP-port pair.

Then, the generating unit 403 generates a sequence associated with the number of concurrent connections of the target IP or IP-port pair in each interval and outputs the sequence. The sequence is denoted by X[n] (X[n]=X1, X2, ..., Xn), wherein n represents nth time interval. The value of Xn is the number of records in the table of the nth time interval.

It is known that, when a peer chokes one of its neighbors, the peer will stop uploading operation to this neighbor, which results in the peer's behavior of ending existing data transmission session between the peer and this neighbor; and when a peer unchokes one of its neighbors, uploading operation from the peer to this neighbor is started, which results in the peer's behavior of starting a new data transmission session with that neighbor. The transmission sessions sequence generating unit 50 is provided to generate a sequence associated with the number of staring a new data transmission session and ending an existing data transmission session.

Figure 3:
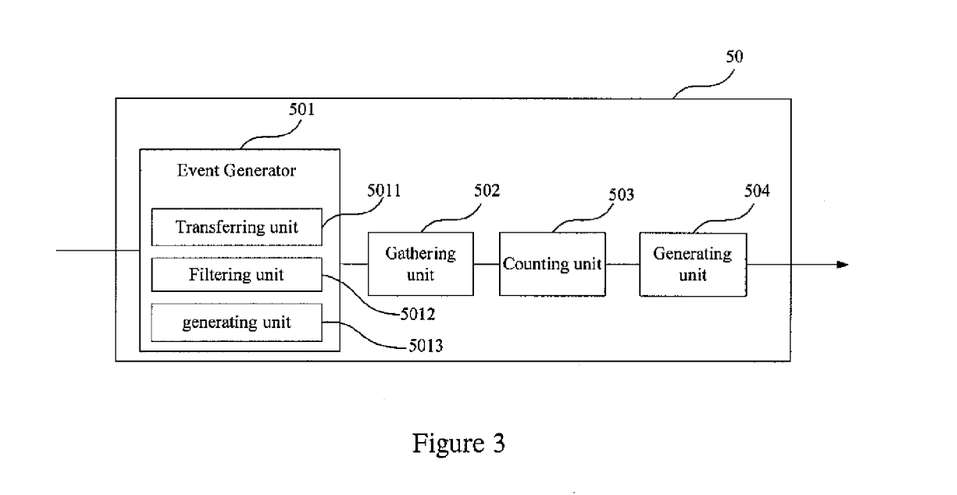
FIG. 3 is a block diagram schematically illustrating the transmission sessions sequence generating unit showed in FIG. 1.

Like the concurrent connections number sequence generating unit 40, the transmission sessions sequence generating unit 50 receives the output from the filter 20 as shown in FIG. 3, and comprises an Event Generator (EG) 501, a gathering unit 502, a counting unit 503 and a generating unit 504.

The EG 501 generates an event trace which is composed of triggered events, either data transmission session Start Event (SE) or data transmission session End Event (EE). To this end, the EG 501 includes a transferring unit 5011, a filtering unit 5012 and a generating unit 5013.

The transferring unit 5011 receives the packet trace output from the filter 20 and transfers the received trace (i.e. packet-level trace) into individual data flows. Each data flow is composed of a certain number of packets with the same five-tuple information, namely, with the same source IP address and port number, same destination IP address and port number and transport layer protocol.

Moreover, the time interval between any two consecutive packets of one data flow should be smaller than a pre-defined threshold. If a data flow comprises very few packets or a lot of small packets, the content of the data flow will be meaningless. As a result, a filter unit 5012 is configured to filter out those meaningless data flows. The output of the filter unit 5012 will be active flows, each of which comprises a number of larger packets. It is advisable that the number of packets of one active data flow should be larger than a pre-determined value and the size of each packet should be larger than a threshold.

Subsequently, each active data flow is divided into small flows according to a parameter and an event trace is generated by the generating unit 5013 and output, wherein the parameter is the threshold of the time interval between any two consecutive packets of one flow.

Specifically, the time interval between two consecutive packets is compared with the predetermined threshold. If the time interval between two consecutive packets is larger than the threshold, these two packets will be considered belonging to two different flows and two events are triggered and recorded accordingly. The first event is the data transmission session End Event whose time stamp is the same as that of a preceding packet (this former packet belongs to the preceding flow). And the second event is the data transmission session Start Event whose time stamp is the same as that of a latter packet (the latter packet belongs to the latter flow).

Figure 5:
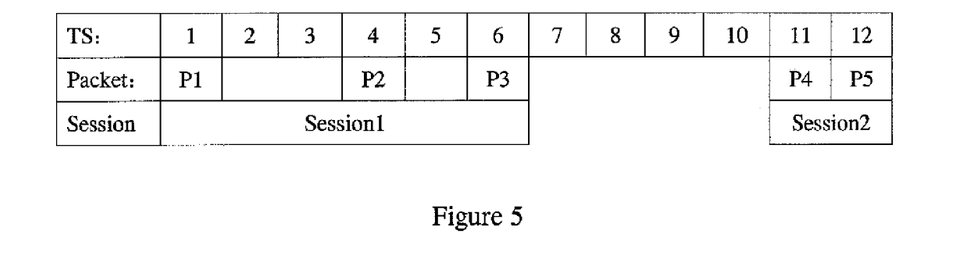
FIG. 5 illustrates a simple example in which a large flow is divided into small flows according to the present invention.

FIG. 5 illustrates a simple example of how a large flow is divided into small flows, given that the time interval threshold is 3 seconds. Because the time interval between P3 and P4 is 11−6−1=4 seconds, larger than the threshold 3 seconds, P3 and P4 are aggregated into two different small flows: Session 1 and Session 2. Session 1 ends at the 6th second, which is the same as the time stamp of P3, while Session 2 starts at the 11th seconds which is the same as the time stamp of P4.

Return to FIG. 3, Event Generator 501 outputs an event trace as described above. The gathering unit 502 gathers all the events output from the event generator 501 based on their time stamps (TS). The counting unit 503 counts the gathered events associated with the target IP or IP-port pair. The generating unit 504 generates a sequence associated with the number of events of the target IP or IP-port pair. Herein, the generated sequence is denoted by Y[n] (Y[n]=Y1, Y2, ..., Yn), wherein n represents nth time interval. The value of Yn is the number of events triggered in the nth time interval. Thus, the sequence associated with the number of starting a new data transmission session and ending an existing data transmission sessions is generated and output from the transmission session sequence generating unit 50.

Specifically, in the process of counting, the Start Event (SE) and End Event (EE), these two Events could be separately counted and in result, two sub-sequences would be generated, Ys[n] and Ye[n]. For most P2P applications, Ys[n] and Ye[n] own the same characteristics (e.g. frequency-domain) as Y[n]. However, it is possible that for some newly designed P2P applications, their Ys[n] and Ye[n] could have different frequency-domain characteristics. Though these different characteristics are still owned by Y[n] it is believed that more detail information and frequency-domain characteristics could be obtained when separately treating SE and EE, if necessary.

Figure 4:
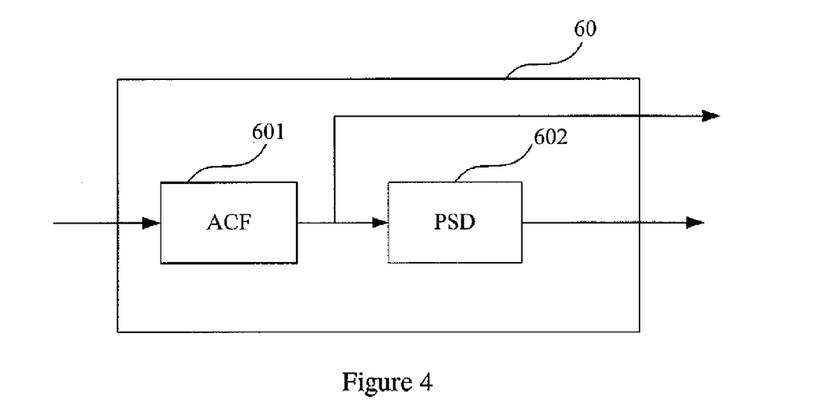
FIG. 4 is a block diagram schematically illustrating the sequence processor showed in FIG. 1.

Referring to FIG. 1 again, the outputs X[n] and Y[n] of the generating units 40 and 50 are input into a Sequence Processor (SP) 60. The SP 60 comprises an Auto-Correlation Function (ACF) unit 601 and a Power-Spectral Density Function (PSD) unit 602. Since both sequences X[n] and Y[n] are random sequences, it is necessary to apply ACF to the sequences X[n] and Y[n] before the PSD unit 602 applies the PSD thereon. The result of the PSD unit 601 is a frequency-domain signal revealing the frequency-domain characteristics of an original time-domain sequence from units 40 and 50. The results of both the ACF unit 601 and the PSD unit 602 are respectively output to the analyzer 70.

The analyzer 70 is configured to realize the signatures establishment and applications identification. In particular, the analyzer 70 may operate to determine whether the original packet trace input into the system 100 is artificially controlled and a specific P2P application producing these packets is known beforehand. If it is the case, the frequency-domain characteristics obtained from the SP 60 are considered as behavioral signatures of this known P2P application. In the other cases, the system 100 will process an original input packet trace collected from a certain network gateway or an intermediate node, and the analyzer 70 will identify P2P applications from the mixed packet trace based on the frequency-domain characteristics or behavioral signatures.

Since a host running P2P applications (both content distribution and streaming) always establishes quite a few concurrent connections with its neighbor peers, analyzing the IP or IP-port pair with such few concurrent connections (e.g. less than 2) is meaningless. Those target IPs or IP-port pairs with few concurrent connections are filtered out by the analyzer 70. Then, the analyzer 70 operates to map the filtered frequency-domain characteristics or behavioral signatures to the existing behavioral signatures of the specific P2P applications.

It is possible to apply several existing pattern recognition methods to the above-mentioned mapping operation. Some simple schemes may also be applied to do the mapping operation. For example, one of the well-known P2P streaming software, PPStream, has the following periodic behaviors: each client host running PPStream will send to a large number of neighbor peers its buffer map every 15 seconds which means the concurrent connection number sequence of this client host will have characteristic frequency at $f=1/15$ Hz after the sequence is transferred into frequency-domain. In addition, the transmission sessions sequence of this client host also has this $f=1/15$ Hz characteristic frequency. These two characteristic frequencies may be regarded as the behavioral-signature of PPStream software. All the traffic associated with one target IP or IP-port pair will be identified as the PPStream traffic if the traffic own these two characteristic frequencies. Another example is P2P file sharing software, Bit-torrent (BT). According to designing protocols of BT, the concurrent connection number sequence of a BT client has no characteristic frequency while the transmission sessions sequence of this client has two different characteristic frequencies, $f1=1/10$ Hz and $f2=1/30$ Hz. Thus, Bit-torrent traffic may be identified in the similar way.

Figure 6:
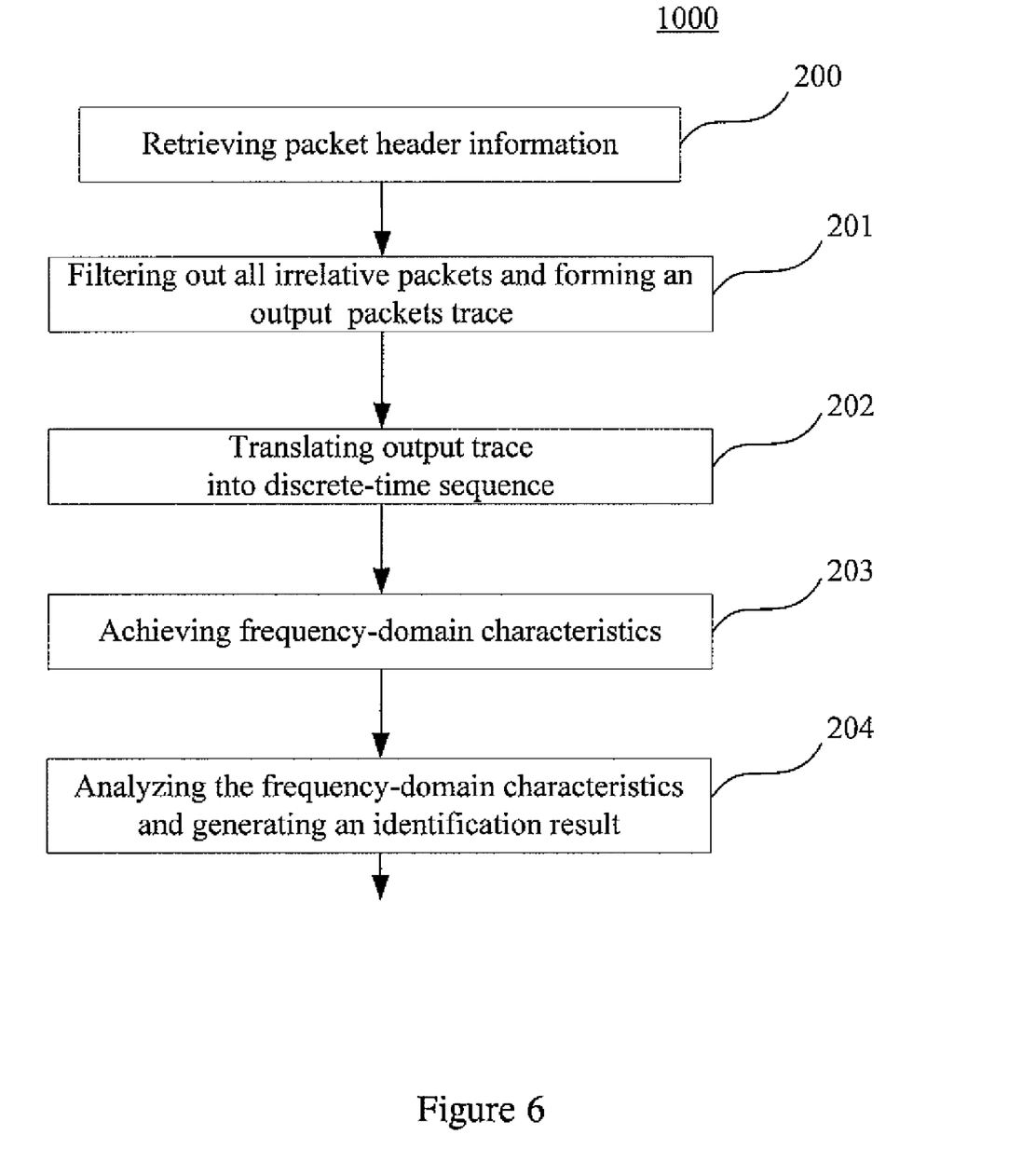
FIG. 6 shows an exemplary process for identifying P2P applications and specific P2P software from an original mixed packet trace according to the invention.

FIG. 6 shows an exemplary process 1000 of identifying P2P applications and identifying specific P2P software from an original mixed packet trace according to the invention.

Referring to FIG. 6, the process 1000 begins at step 200, at which the packet header is retrieved from each packet of the original packet trace. The original packet trace may be collected from a network gateway or an intermediate node.

At step 201, all irrelative packets are filtered out and the output of this step is a packet trace comprising all the packets equipped with a target IP or IP-port pair.

At step 202, the packet trace is translated into discrete-time sequences. The processes 202 will be discussed in detail in referring to FIG. 7 later.

Step 203 performs to transfer the discrete-time sequences into frequency-domain ones, which are the behavioral-signatures of the original packet trace. Specifically, ACF is applied to the discrete-time sequences to achieve the first sequence, and then PSD is applied to the sequences to achieve the second sequence. The first and second sequences are called unknown traffic behavioral-signatures.

At step 204, the unknown traffic behavioral-signatures are analyzed and an identification result is generated. In particular, the analysis is performed by comparing the unknown traffic behavioral-signatures with the signatures of specific P2P applications pre-built. The step 204 will be further described in referring to FIG. 10 later.

Hereinafter, a step 202 will be further discussed in referring to FIG. 7.

Figure 7:
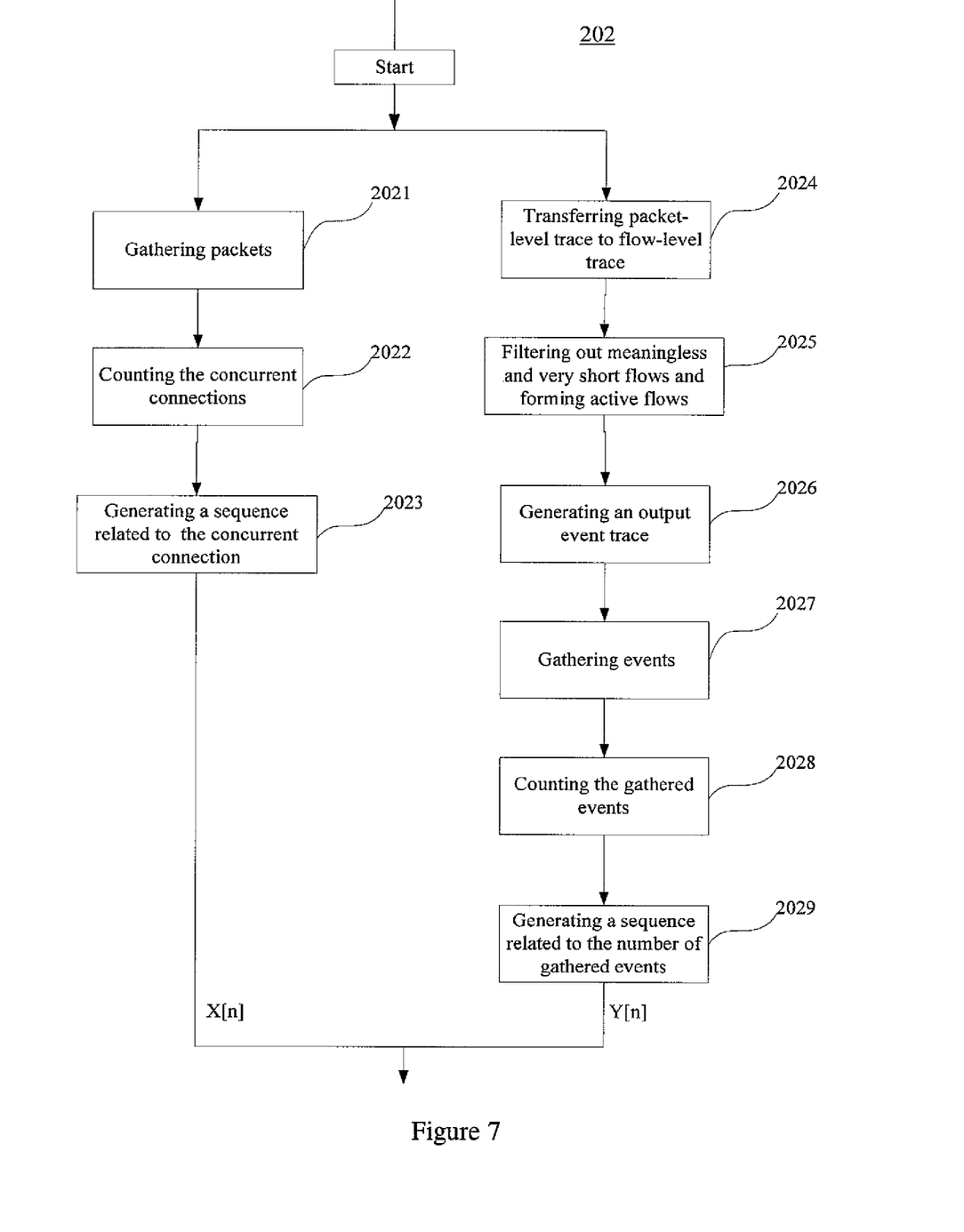
FIG. 7 illustrates a detailed process of translating the output packet trace into discrete-time sequences.

FIG. 7 shows the process to generate a concurrent connection number sequence through sub-steps 2021-2023, and to generate a transmission session sequence through sub-steps 2024-2029, respectively.

Specifically, at step 2021, all of the packets from the packet trace received from step 201 are gathered based on their time stamps.

Then, step 2022 counts the concurrent connections for each time interval. As described above, all these gathered packets share a common characteristic, either their source IP or IP-port pair or destination IP or IP-port pair being same, just the target IP or IP-port pair. Herein, the remaining IP or IP-port pair, excluding the target IP or IP-port pair each packet has (either at the source or destination position), is referred to as non-target IP or IP-port. In particular, the step 2022 is carried out based on one table for each time interval to record different non-target IPs or IP-port pairs. When the non-target IP or IP-port pair of a packet has no record in the table, a new record is appended. In other words, the table only records non-target IPs or IP-port pairs, regardless of whether it is source IP, IP-port pair or destination IP, IP-port pair. After checking all the packets belonging to the same time interval, the number of the records in the related table is the same as the number of concurrent connections of the target IP or IP-port pair.

At step 2023, a sequence $X[n]=X1, X2, \ldots, Xn$ associated with the number of concurrent connections is generated based on the counted numbers, wherein n represents nth time interval. The value of Xn is the number of records in the table of the nth time interval.

At step 2024, the packets from the packet trace generated from step 201 is transferred to individual flows, which is composed of a certain number of packets with the same five-tuple information (same source IP address and port number, same destination IP address and port number and transport layer protocol). Moreover, the time interval between any two consecutive packets of the flow should be smaller than some pre-defined threshold. At step 2025, the meaningless and very short flows are filtered out. Meanwhile, active flows comprising a number of larger packets are formed. The step 2025 will be discussed in detail in referring to FIG. 8 later.

Then, the remaining flow is divided into small flows, and an output event trace which includes a time stamp (when this event is triggered) and property (start event or end event) is generated at step 2026.

Then, the process proceeds to step 2027, at which the output event trace is gathered based on their time stamps. At step 2028, the numbers of the gathered events for each time interval are counted in a similar way of step 2022. At step 2029, a sequence associated with the number of starting a new data transmission session and ending an existing data transmission session is generated based on the counted number. Herein, the sequence is denoted by $Y[n]$ ($Y[n]=Y1, Y2, \ldots, Yn$), wherein n represents nth time interval. The value of Yn is the number of events triggered in the nth time interval. The step 2029 will be discussed in detail in referring to FIG. 9 later.

Figure 8:
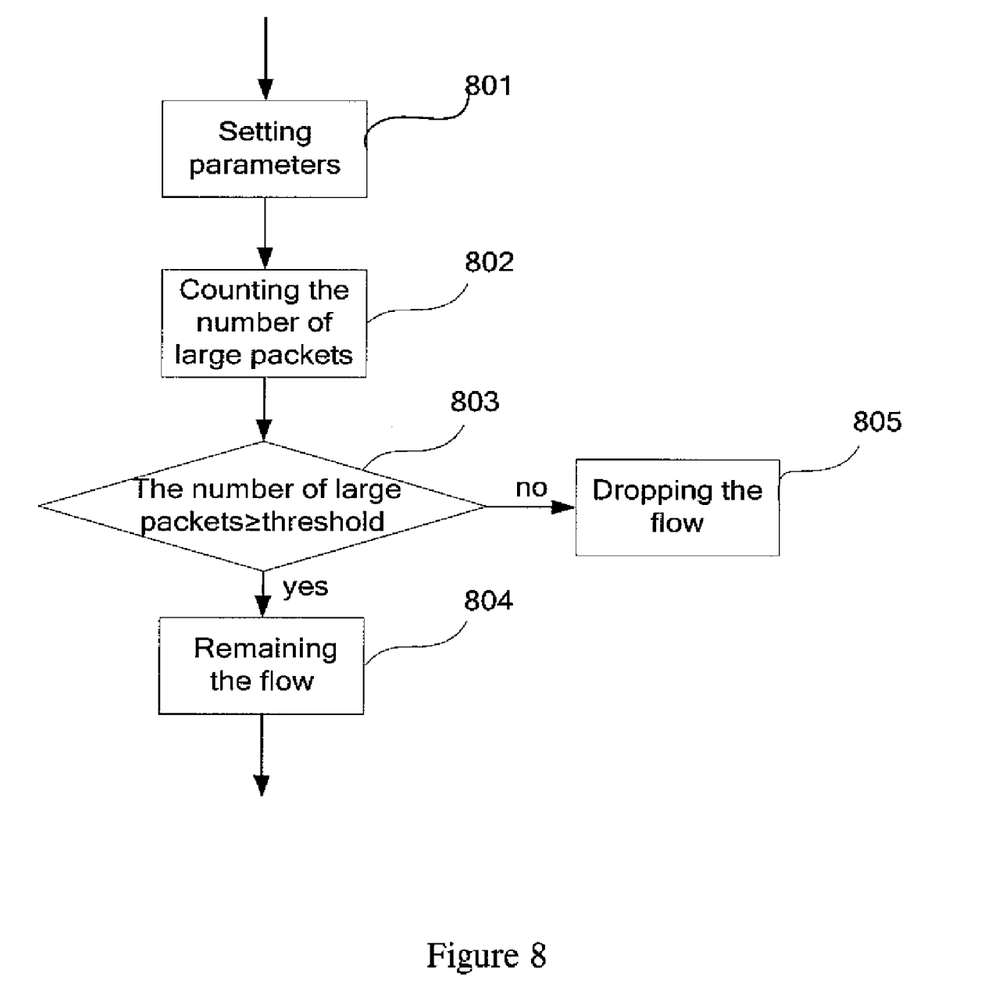
FIG. 8 illustrates a detailed process of step 2025 in FIG. 7.

FIG. 8 shows the details of the step 2025. At step 801, parameters are set, which comprise the size of a packet defined as a large packet and a threshold of the number of large packets required. At step 802, the size of each packet in the output event trace is compared with the predetermined size and the large packets are counted. A packet with a size larger than the predetermined size is considered as a large packet. Then, at step 803, it is determined whether the number of large packets is larger than or equal to the predetermined number of large packets. If it is the case, the flow remains at step 804. If not, the flow is dropped at step 805.

Figure 9:
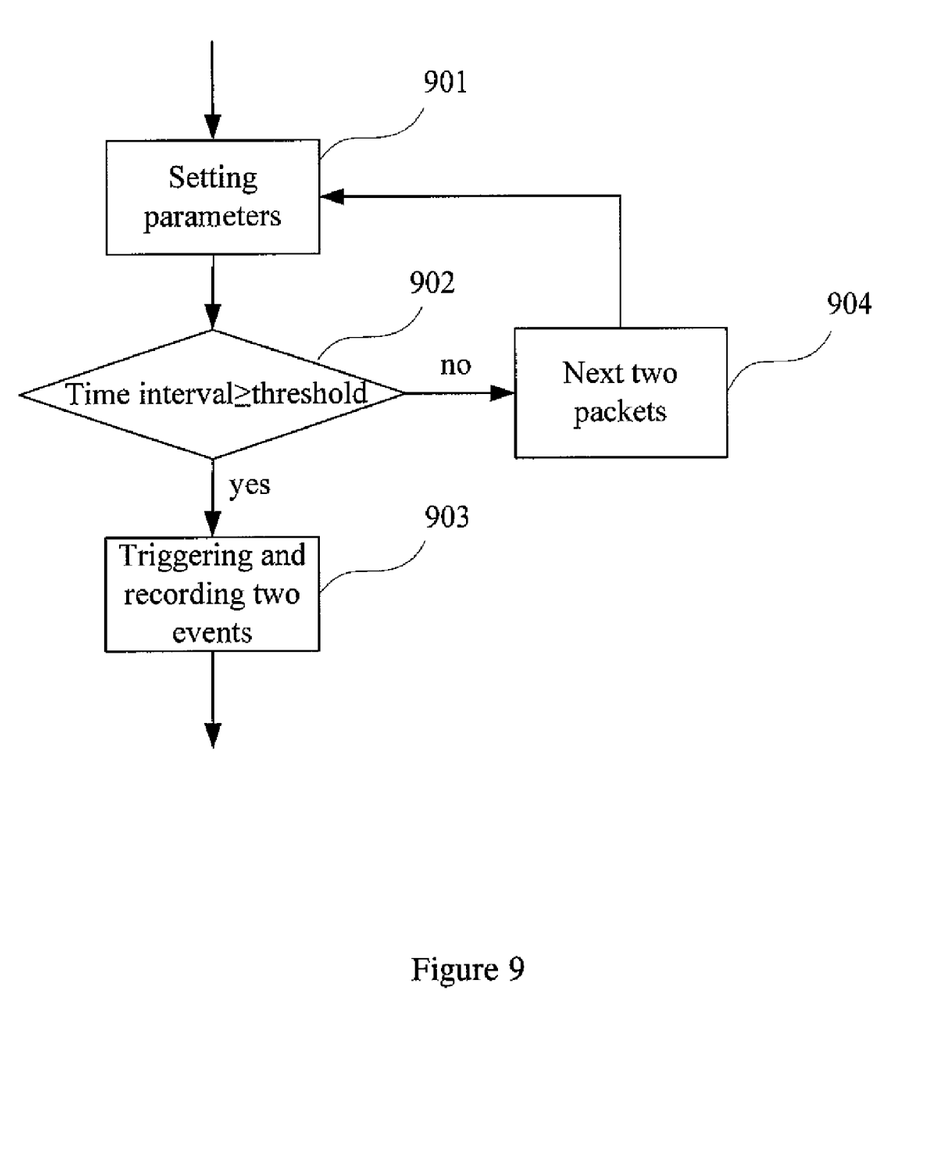
FIG. 9 illustrates a detailed process of step 2029 in FIG. 7.

FIG. 9 shows the details of the step 2029.

At step 901, a threshold of a time interval between any two consecutive packets of one flow is set. At step 902, a time interval between two consecutive packets is compared with the set threshold. If the time interval between two consecutive packets is larger than the threshold, these two packets will be considered belonging to two different flows and two events are triggered and recorded at step 903. The first event is the existing data transmission session end event whose time stamp is the same as that of the preceding packet. And the second event is the data transmission session start event whose time stamp is the same as that of the latter packet. Otherwise, next two packets are focused on at step 904 and the process turns to the step 902.

Figure 10:
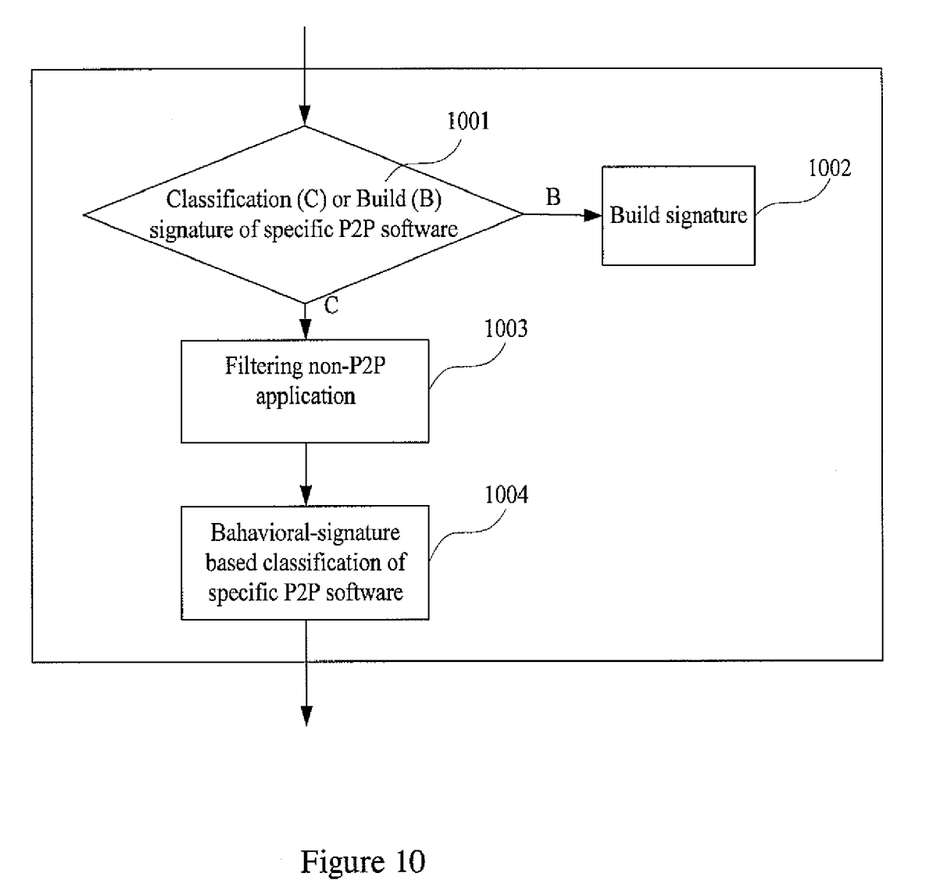
FIG. 10 illustrates a detailed process of step 204 in FIG. 6.

Referring to FIG. 10, the step 204 of analyzing the frequency-domain characteristics is shown in details.

At step 1001, it is determined whether the original input packet trace is artificially controlled and the specific P2P application producing the packet trace is known beforehand. If it is the case, the frequency-domain characteristics (i.e. the unknown behavioral-signatures) obtained at step 203 are considered as behavioral signatures of this known P2P application at step 1002. When the original input packet trace is mixed and collected by some network gateway or intermediate node, it is identified based on the frequency-domain characteristics or behavioral signatures at steps 1003 and 1004.

Since a host running P2P applications (both content distribution and streaming) always establishes quite a few concurrent connections with its neighbor peers, analyzing the IP or IP-port pair with too few concurrent connections (e.g. less than 2) is meaningless.

At step 1003, the target IP or IP-port pair with too few concurrent connections is filtered out. At step 1004, the filtered frequency-domain characteristics or behavioral signatures are mapped to the existing behavioral signatures of the specific P2P applications.

Thus, a novel system and process for identifying Peer-to-Peer applications from original mixed packet trace has been described. It will be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A system for identifying P2P applications on a network based on behavioral-signatures, comprising:
    a retrieving unit configured to retrieve a packet header of each packet from a packet trace collected from the network;
    a filter configured to filter out all the irrelative packets from the retrieved packets and allow packets equipped with a target IP or IP-port pair to pass through;
    a first sequence generating unit configured to generate a first discrete-time sequence from the packets equipped with the target IP or IP-port pair;
    a second sequence generating unit configured to generate a second discrete-time sequence from the packets equipped with the target IP or IP-port pair;
    a sequence processor configured to generate frequency-domain characteristics of the first and the second sequences; and
    an analyzer configured to capture the frequency-domain characteristics so as to identify the P2P applications based on the frequency-domain characteristics.

2. The system of claim 1, further comprising:
    a filtering condition setting unit configured to set the target IP or IP-port pair.

3. The system of claim 1, wherein the first sequence generating unit further comprises:
    a gathering unit configured to gather the packets equipped with the target IP or IP-port pair by their time stamps;
    a counting unit configured to count the non-target IP or IP-port pair in the gathered packets; and
    a generating unit configured to generate the first discrete-time sequence based on the counted result.

4. The system of claim 3, wherein the first discrete-time sequence is a concurrent connections number sequence associated with the target IP or IP-port pair in each time interval.

5. The system of claim 1, wherein the second sequence generating unit further comprises:
    an event generator configured to generate an event associated with the target IP or IP-port pair;
    a gathering unit configured to gather the generated event based on its time stamp;
    a counting unit configured to count the gathered event; and
    a generating unit configured to generate the second discrete-time sequence based on the counted result.

6. The system of claim 5, wherein the event generator further comprises:
    a transferring unit configured to transfer the packets equipped with the target IP or IP-port pair into individual data flows;
    a filtering unit configured to obtain an active data flow; and
    a generating unit configured to generate the events from the active data flow.

7. The system of claim 6 wherein each of the data flows includes packets with the same five-tuple information composed of the same source IP address and port number, same destination IP address and port number and transport layer protocol.

8. The system of claim 5, wherein the events include a new data transmission session start event and an existing data transmission session end event.

9. The system of claim 1, wherein the sequence processor further comprises:
    an Auto-Correlation Function unit configured to apply an Auto-Correlation Function operation to the first and second discrete-time sequences to remove random components of the first and second sequences; and
    a Power-Spectral Density Function unit configured to apply a Power-Spectral Density Function operation to the sequences in which the random components have already been removed so as to achieve a frequency-domain characteristic.

10. The system of claim 1, wherein the analyzer is further configured to map the frequency-domain characteristics to behavior-signatures pre-built.

11. The system of claim 1, wherein the mapping operation is fulfilled with pattern recognition technology or simple comparing.

12. The system of claim 1, wherein the P2P applications include P2P content distribution and P2P streaming applications.

13. A method for identifying P2P applications on a network based on behavioral-signatures, comprising:
    retrieving a packet header of each packet from a packet trace collected from the networks;
    filtering out the retrieved packets and outputting packets equipped with a target IP or IP-port pair;
    generating a first discrete-time sequence from the packets equipped with the target IP or IP-port pair;
    generating a second discrete-time sequence from packets associated with the target IP or IP-port pair;
    generating frequency-domain characteristics of the first and the second sequences by a sequence processor; and
    analyzing the frequency-domain characteristics to identify the P2P applications.

14. The method of claim 13, further comprising a step of setting the target IP or IP-port pair by establishing at least one filtering condition.

15. The method of claim 14, wherein the step of generating the first discrete-time sequence further comprises:
    gathering the packets equipped with the target IP or IP-port pair by their time stamps;
    counting the number of concurrent connections of the target IP or IP-port pair in the gathered packets; and
    generating the first discrete-time sequence based on the counting result.

16. The method of claim 13, wherein the step of generating the second discrete-time sequence further comprises:
   generating events associated with the target IP or IP-port pair;
   gathering the generated events based on their time stamps;
   counting the gathered events; and
   generating the second discrete-time sequence based on the counting result.

17. The method of claim 16, wherein the step of generating the events further comprises:
   transferring the packets equipped with the target IP or IP-port pair into individual data flows;
   filtering the transferred data flows to output an active flow comprising a certain number of larger packets; and
   generating the events from the active flow.

18. The method of claim 17, wherein the individual data flows include packets with the same five-tuple information composed of the same source IP address and port number, same destination IP address and port number and transport layer protocol.

19. The method of claim 18, wherein the events include a new data transmission session start event and an existing data transmission session end event.

20. The method of claim 13, wherein the step of generating frequency-domain characteristics further comprises:
   applying an Auto-Correlation Function operation to the first and second discrete-time sequences to remove random components of the first and second sequences; and
   applying a Power-Spectral Density Function operation to the sequences in which the random components have already been removed so as to achieve a frequency-domain characteristic.

21. The method of claim 13, wherein the step of analyzing the frequency-domain characteristics further comprises mapping the frequency-domain characteristics to behavior-signatures pre-built.

22. The method of claim 21, wherein the mapping operation is fulfilled with pattern recognition technology or simple comparing.

* * * * *